No. 861,310.　　　　　　　　　　PATENTED JULY 30, 1907.
J. G. NOLEN.
ELECTROTHERMAL SWITCH.
APPLICATION FILED JULY 6, 1903.

2 SHEETS—SHEET 1.

Witnesses:
Ray White
Harry ?

Inventor:
James G. Nolen
By Forée Bain, Atty.

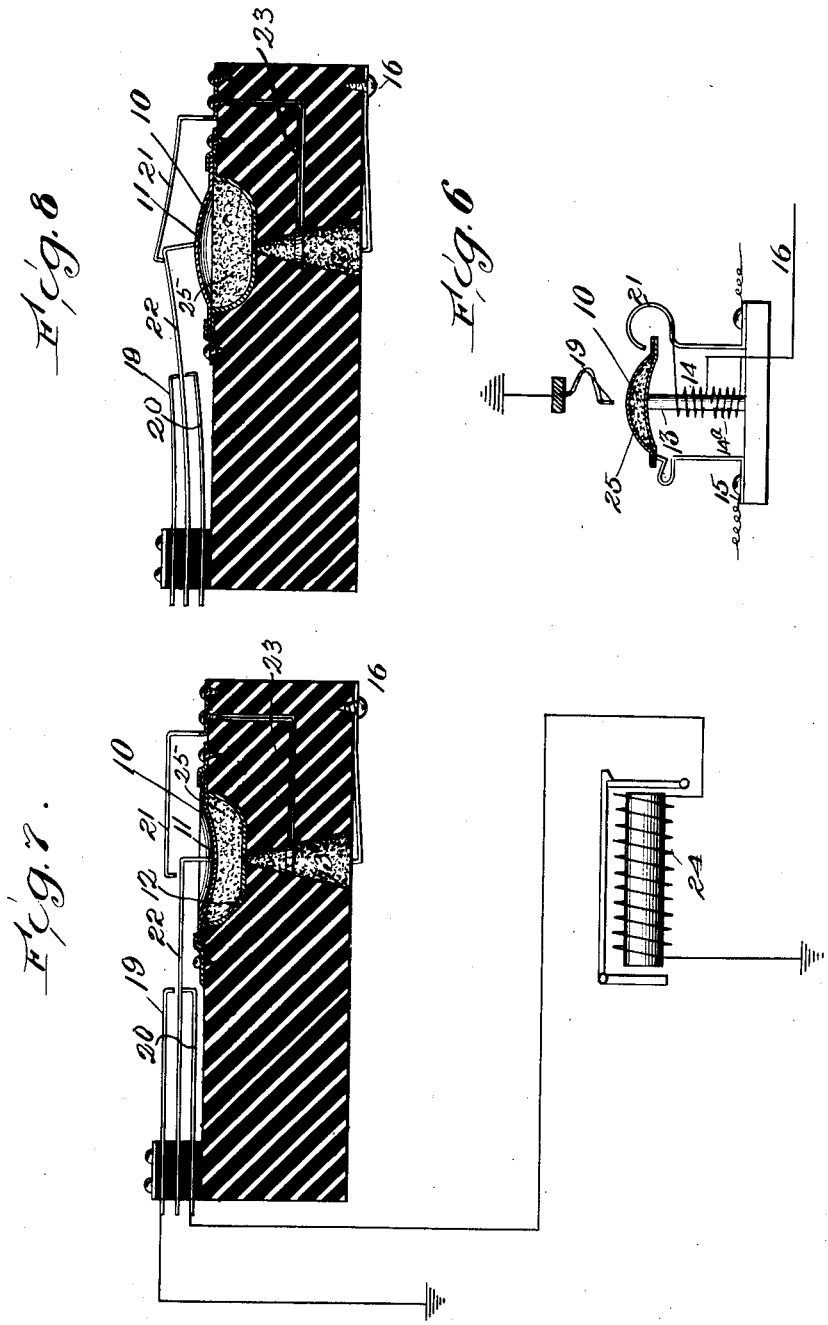

UNITED STATES PATENT OFFICE.

JAMES G. NOLEN, OF CHICAGO, ILLINOIS, ASSIGNOR TO FRANK B. COOK, OF CHICAGO, ILLINOIS.

ELECTROTHERMAL SWITCH.

No. 861,310.　　　　Specification of Letters Patent.　　　　Patented July 30, 1907.

Application filed July 6, 1903. Serial No. 164,259.

*To all whom it may concern:*

Be it known that I, JAMES G. NOLEN, of Chicago, in the county of Cook and State of Illinois, have invented certain new and useful Improvements in Electrothermal Switches; and I hereby declare that the following is a full, clear, and exact description thereof, reference being had to the accompanying drawings, which form part of this specification.

My invention relates to improvements in electrothermal switches, my object being, first, to provide a switch which is capable of automatic operation for the purpose of controlling one or more electric circuits, and which may be operated by an initiative flow of electricity or by an abnormal increase of same, the electrothermal effect of the said current producing movement of a thermal responsive device to open, close or change an electric circuit, to divert the flow of current from a given circuit, to arrest the flow of current in a given circuit, or to direct it into another circuit established by the automatic switch; second, to provide means for maintaining a circuit open or closed after it has been automatically opened or closed by means whereby the expenditure of energy is changed from that required to operate the switch to open or close the circuit; and third, to provide a device which is responsive to the flow of current in a given circuit after a predetermined time has elapsed subsequent to closing the circuit, in this respect differing from the instantaneous action of an electro-magnet or solenoid.

Figure 3:
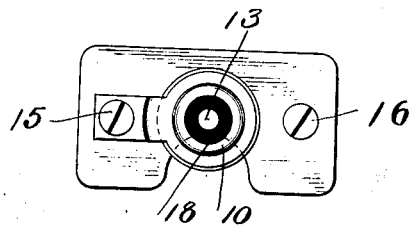
Figure 1:
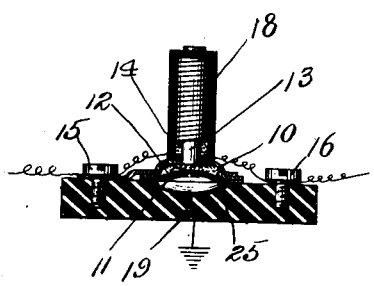
Figure 2:
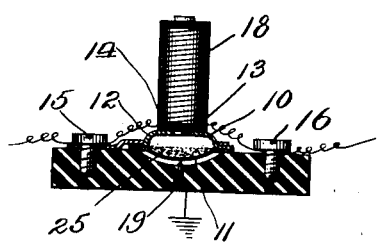
Figure 4:
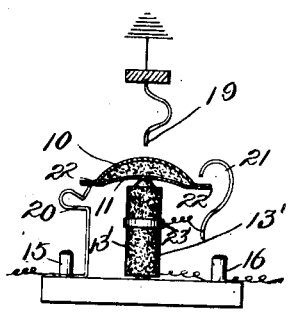
Figure 5:
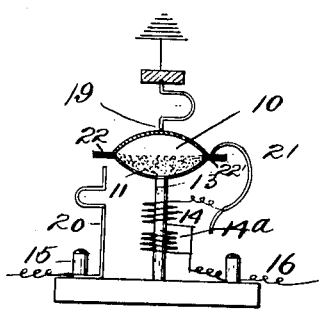

In the drawings illustrating my invention,—Figure 1 is a central vertical section of my electro-thermal switching device showing the parts in position to be operated by the heating effect of the device. Fig. 2 is the same view as shown in Fig. 1, but showing the parts in operated position. Fig. 3 is a top plan view of Figs. 1 and 2. Fig. 4 is a side elevation of a modified form of the invention with portions shown in cross-section, showing the parts in position to be operated by the heating effect of the device. Fig. 5 is a view of a modification of Fig. 4, taken the same as the latter, with the parts in operated position. Fig. 6 is a view of a modified form of Fig. 5, taken the same as the latter, with the parts shown in operative position. Figs. 7 and 8 show a central cross-section of a modified form of the invention adapted to control any desired number of circuits, Fig. 7 showing the parts of the device in position to be operated by the heating effect of the current, and Fig. 8 showing the parts of the device in the position which they occupy after operation. Fig. 7 also shows a circuit arrangement connected to be protected from an abnormal flow of electricity by the device of the invention.

Like characters refer to like parts in the several figures.

10 indicates a tightly-sealed chamber which has for its walls a rigid wall 12 and a diaphragm 11, preferably of aluminium or some conducting material and capable of occupying either a concave or convex position relatively to the chamber, depending upon the difference of pressure on the two sides of the diaphragm. The diaphragm 11 may be made of non-conducting material in which case it may carry a conductor or control one or more circuits as desired. The heating coil 14 is placed in close proximity to the chamber 10, is suitably adapted and arranged to heat the contents of the chamber when the required current traverses it, and is provided with suitable terminals 15 and 16.

The coil 14 is preferably covered with a jacket 18 of heat-insulating material, such as asbestos or the like, for the purpose of preventing the radiation of heat where it is not utilized. An adjustable contact 19 is arranged to make electrical connection with the diaphragm 11 when the latter is operated as shown in Fig. 2 by the expansion of the contents of the chamber 10. This contact 19 is preferably connected to earth. The contents 25 of chamber 10 may be a fluid having a high coefficient of expansion, such as naphtha, alcohol, spirits of ammonia, chloroform, mercury, or the like, or the chamber 10 may be filled, or partially filled, with a material which will harden at a comparatively low temperature and will become fluid and thereby expand, at a somewhat higher temperature, such latter material being preferably paraffin, bees-wax, sealing wax or the like. Any fluid with which the chamber may be filled will answer the purpose to a greater or less degree. A material possessing a high specific heat coefficient is preferable when it is desirable to delay the operation of the switch to a greater or less degree after the current in the circuit is sufficient to produce the desired heating effect. The greater the specific heat of the material within the chamber the slower will become the action of the diaphragm. When the chamber is filled with air, the operation of the diaphragm will be quicker, on account of the low specific heat of air; but when it is filled with a material such as paraffin, the action of the diaphragm will not be so quick. Thus it will be seen that the time of action of the diaphragm, after the heat is applied, may be regulated by the use of the proper material in the chamber.

In Figs. 1, 2, 3, 7 and 8 the heating element is placed in close proximity to the rigid wall of the chamber, while in Figs. 4, 5 and 6 the heating element is placed in close proximity to the flexible wall of the chamber. In Figs. 4, 7 and 8, the heat-producing element $13^1$ is a stick of graphite or the like. The heat from the graphite, due to a current of electricity traversing same, is imparted to the casing with which it is preferably in contact, and by this means the contents of the chamber is heated and thereby expanded.

The heat conducting member 13, Figs. 1, 2, 3, 5 and 6, is preferably a piece of metal, such as brass or iron, which is a good conductor of heat and around which the heating coil or coils are wound. This heat-conducting element 13 is preferably in contact with the casing of the chamber 10. Contact 20 is connected with terminal 15, Figs. 4, 5, and 6, and contact 21 is connected with the heating element of the device.

22 and 22¹ are contacts which are operated by the expansion of the material in the chamber 10.

In Figs. 1, 2, and 3, the circuit between the terminals 15 and 16 is not interrupted by the operation of the device.

In Figs. 4, 5 and 6, the operation of the device preferably interrupts the main circuit and closes a circuit to ground. The main circuit may be first interrupted and then the ground circuit made, or vice versa.

The operation of the device of the invention is as follows:—In Figs. 1, 2 and 3 a normal current of electricity may traverse the heating coil 14 without heating the device sufficiently to expand the expansible material 25 in the chamber 10 to operate the diaphragm 11; but when an abnormally large current traverses the coil 14, the expansible material 25 receives sufficient heat from the coil to cause an expansion thereof which will after a little time, depending upon the strength of current, operate the diaphragm 11 from the position shown in Fig. 1 to the position shown in Fig. 2, and thereby connect the main circuit 15, 14, 16 to ground at 19, from terminal 15 through the diaphragm 11. If the abnormal current comes from 16, the coil 14 will be left in the circuit to ground and will remain heated and thereby hold the diaphragm in operated position until the abnormal current subsides. If the abnormal current comes from 15 the coil 14 will be shunted by the ground circuit as soon as the diaphragm has operated and closed the ground contact, in which case the diaphragm will again open the ground contact as soon as the device cools, as the abnormal current will probably be shunted from the coil 14 while the ground contact is closed and the heating will subside. If after the ground contact again opens, the abnormal current is still in the circuit, the coil 14 will again heat and cause the diaphragm to again close the circuit from 15 to ground. Whether the abnormal current comes from 15 or 16, the device always returns to its original state and may be again operated, after the abnormal current is removed from the circuit and the heating has subsided.

In Figs. 5 and 6, the coil 14ᵃ heats the expansible material 25 in chamber 10 to operate the device, when an abnormal current traverses the circuit 16, 14ᵃ, 13, 15, Fig. 6. When the device operates, as shown in Fig. 5, this circuit is broken at contact 20, which opens the circuit of coil 14ᵃ, and the circuit 16, 14, 21, 22¹, 19, is closed at contact 21 which closes the circuit of coil 14 and thereby causes it to produce heat to hold the device in operated position, due to the abnormal current now traversing same. After the device has operated, coils 14 and 14ᵃ are preferably connected in multiple. When the abnormal current subsides, the device returns to its normal position, Fig. 6, and may then be operated again as originally.

In Fig. 4 the heating element 13¹, preferably a stick of resistance material such as graphite, causes the diaphragm 11 to operate the same as in Figs. 5 and 6, when an abnormal current traverses the heating element 13¹, which is in close proximity to the chamber 10 so as to heat the contents thereof, and thereby opens contact 20 in the main circuit and closes contacts 21 and 19. Contact 21, when closed, short-circuits the portion of the graphite 13¹ which lies between the ring 23 which is placed thereupon and the diaphragm 11, and thereby allows only the remainder of the element 13¹ to remain in the grounded heating circuit to produce heat to hold the device in operated position while the abnormal current is connected with the device. The ring 23 may be adjusted upon the graphite 13¹ by sliding it thereon, so that any desired proportion of 13¹ may be short-circuited when the device operates, and the remainder allowed to produce heat to hold the device in operated position. In this manner the heating effect of the element 13¹, after the device has operated, can be regulated as desired.

In Figs. 7 and 8 the heating element 13¹ is arranged the same as in Fig. 4 and serves the same purpose. In this arrangement the expansion of the material in chamber 10 causes the diaphragm 11 to open contact 20 in the main circuit and to close contacts 19 and 21 to ground the main circuit and short-circuit or shunt a portion of the heating element 13¹, respectively. The device of Fig. 7 is shown arranged to protect the signal device or apparatus at 24 from the abnormal electric current by cutting it out of circuit at contact 20.

The device of this invention is automatic in both of its operations, either when being heated or when cooling. It is responsive to an abnormally large flow of current to control any desired circuit or circuits, and again it is responsive to a decrease in the abnormally large current, as hereinbefore described. It is therefore an automatic safety switch adapted by its operation to control, open or close, any desired electrical circuits, and it is especially arranged in this invention to protect an electric circuit and the apparatus associated therewith from abnormal electric currents. It is also adapted to reëstablish normal conditions after the abnormal current has ceased to flow.

Having thus described my invention, what I claim as new and desire to secure by Letters Patent, is:—

1. In a thermo-electric device of the character described, a casing forming a completely inclosed chamber and having a portion thereof flexible, an expansible medium in said chamber, and heat-producing means exterior to said chamber and arranged to heat the expansible medium under abnormal conditions to expand the latter and cause same to operate the said casing to control a circuit.

2. In a thermo-electric device of the character described, a casing forming a completely inclosed chamber and having a portion thereof flexible, an expansible medium in said chamber, heat-producing means wholly exterior to said chamber and arranged to heat the expansible medium under abnormal conditions to expand the latter and thereby cause same to operate the said casing, and means coöperating with the casing whereby the operation of the latter changes the circuit through the heat-producing means to vary the heating effect of the latter for purposes of regulating the operation of the said casing thereafter, substantially as described.

3. In a thermo-electric device of the character described, a casing forming a completely inclosed chamber, a portion of the said casing being a flexible metallic diaphragm, an expansible medium in said chamber, and heat-producing means exterior to said chamber and arranged to heat the expansible medium under abnormal conditions to expand the latter and cause same to operate the said diaphragm to control a circuit.

4. In a thermo-electric device of the character described, a casing forming a completely inclosed chamber and having a portion thereof flexible, an expansible medium in said chamber, contacts arranged to coöperate with the said casing, and homogeneous resistance material exterior to said chamber and arranged to heat the expansible medium under abnormal current conditions to expand the expansible medium and cause same to operate the said flexible casing to control a circuit.

5. In a thermo-electric device of the character described, a casing forming a completely inclosed chamber, a portion of the said casing being a flexible metallic diaphragm, an expansible medium in said chamber and a piece of homogeneous resistance material exterior to said chamber and adapted and arranged to heat the expansible medium under abnormal current conditions to expand the latter and thereby cause same to operate the said diaphragm to control a circuit.

6. In an electric switch or the like, the combination of an expansible casing forming a completely inclosed chamber, an expansible medium in said chamber, a heating member exterior to said chamber and in constant contact with said casing, an electric circuit normally including said heating member, a normally open short-circuit around a portion of said heating member, and contacts arranged to coöperate with the said casing to close the normally-open short-circuit and to open and close other circuits as desired.

7. In a device of the character described, a flexible casing forming a completely inclosed chamber, a medium in said chamber expansible by heat, heat-producing means exterior to said chamber and adapted to heat the expansible medium, and means for varying the heating capacity of the heat-producing means to control the operation of the flexible casing.

8. In a device of the character described, a completely inclosed chamber having a flexible wall, an expansible substance in said chamber, and means exterior to the said chamber to heat the expansible substance and thereby cause same to expand and actuate the said flexible wall for purposes substantially as described.

9. In an electro-thermal switch, a chamber having a flexible wall, an expansible material in said chamber, and heat-producing means exterior to said chamber, for inclusion in a circuit and arranged to heat the device to operate the flexible wall.

10. In a device of the character described, a chamber having a flexible wall operable upon excessive heating of the contents of the chamber, an expansible medium in said chamber, suitable contacts arranged to coöperate with the flexible wall and means exterior to said chamber adapted and arranged to heat the device to operate same.

11. In a device of the character described, an expansible chamber containing an expansible medium, operable upon abnormal heating, suitable contacts arranged to coöperate with the expansible chamber, means exterior to said chamber adapted to heat the latter for operating same, and means for regulating the heating capacity of the heating means during the operation of the device to give same a time adjustment for the operation thereof.

In testimony that I claim the foregoing as my own, I affix my signature in presence of two witnesses.

JAMES G. NOLEN.

In presence of—
 FOREÉ BAIN,
 MARA F. ALLEN.